United States Patent [19]

Gipson et al.

[11] Patent Number: 4,956,586
[45] Date of Patent: Sep. 11, 1990

[54] FREQUENCY INDEPENDENT CRT HORIZONTAL SWEEP GENERATOR HAVING CURRENT FEEDBACK AND IMPROVED PINCUSHION CORRECTION CIRCUITRY

[75] Inventors: Kirk P. Gipson, Roseville; Ronald M. Guly, Davis, both of Calif.

[73] Assignee: Hewlett-Packard Company, Palo Alto, Calif.

[21] Appl. No.: 318,285

[22] Filed: Mar. 3, 1989

[51] Int. Cl.$^5$ .............................................. H01J 29/70
[52] U.S. Cl. ..................................... 315/387; 315/388; 315/411
[58] Field of Search ............... 315/387, 388, 371, 411; 307/228

[56] References Cited

U.S. PATENT DOCUMENTS 4,309,640  1/1982  Gordon ................................. 315/371
4,581,563  4/1986  Rockrohr ............................. 315/388

Primary Examiner—Gregory C. Issing

[57] ABSTRACT

A signal generator which generates an yoke signal for application to a horizontal yoke of a cathode ray tube (CRT) is presented. The signal generator receives a dc signal which indicates the width of the horizontal scan lines of the cathode ray tube and receives a pincushion correction signal. The signal generator includes a voltage source, a yoke current generator, a current feedback network, a summing circuit, an amplifier and a voltage regulator. The summing circuit sums the voltage of the dc signal and the pincushion correction signal. The current feedback network generates a first feedback signal with a first feedback signal voltage proportional to the peak value of current through the horizontal yoke. The amplifier generates a second feedback signal based on the difference in the voltage of the first feedback signal voltage and the summed voltage of the dc signal and the pincushion correction signal. In response to the second feedback signal the voltage regulator varies the voltage of a signal applied to the horizontal yoke so that the second feedback signal indicates that the first feedback signal voltage and the summed voltage of the dc signal and the pincushion correction signal are matched.

13 Claims, 6 Drawing Sheets

FREQUENCY INDEPENDENT CRT HORIZONTAL SWEEP GENERATOR HAVING CURRENT FEEDBACK AND IMPROVED PINCUSHION CORRECTION CIRCUITRY

BACKGROUND

The present invention concerns the generation of a horizontal drive signal which is used to drive the horizontal deflection coil of a cathode ray tube (CRT).

In order to take into account the shape of a CRT screen and the variation of distance electrons travel from an electron gun before colliding with the CRT screen a "pincushion correction signal" is added to the horizontal drive signal. Typically this is done with the use of a transformer. However, this typical method requires a costly and expensive transformer. Further, a resultant pincushion correction circuit is typically sensitive to variations in temperature, supplied voltage or slight component performance variations and is frequency dependent.

SUMMARY OF THE INVENTION

In accordance with the preferred embodiment of the present invention a signal generator which generates an yoke signal for application to a horizontal yoke of a cathode ray tube (CRT) is presented. The signal generator receives a dc signal which indicates the width of the horizontal scan lines of the CRT and receives a pincushion correction signal.

The signal generator includes a voltage source, a yoke current generator, a current feedback network, a summing circuit, an amplifier and a voltage regulator. The summing circuit sums the voltage of the dc signal and the pincushion correction signal. The current feedback network generates a first feedback signal with a first feedback signal voltage proportional to the peak value of current through the horizontal yoke. The amplifier generates a second feedback signal based on the difference in the voltage of the first feedback signal voltage and the summed voltage of the dc signal and the pincushion correction signal. In response to the second feedback signal the voltage regulator varies the voltage of a signal applied to the horizontal yoke so that the second feedback signal indicates that the first feedback signal voltage and the summed voltage of the dc signal and the pincushion correction signal are matched.

A voltage feedback network may be added to the signal generator. The voltage feedback network produces a voltage feedback network signal having a voltage proportional to the voltage of the signal applied to the horizontal yoke by the voltage regulator. The voltage feedback network signal is summed with the first feedback signal voltage before application to the amplifier. The amplifier then generates the second feedback signal based on the difference in the voltage of the first feedback signal voltage summed with the feedback network signal voltage and the summed voltage of the dc signal and the pincushion correction signal.

In the preferred embodiment of the present invention the voltage regulator means includes a pulse width modulator and a filter. The current feedback network includes a resistive divider and a peak detector circuit. The peak detector circuit detects the peak flyback voltage of the yoke current generator through the horizontal yoke and stores a voltage proportional to the peak value of the current as the first feedback signal voltage.

The present invention has several advantages over the prior art. For example, when the horizontal frequency changes the voltage regulator, in response to feedback from the feedback networks, adjusts the voltage of the signal applied to the horizontal yoke so that horizontal line width remains constant. The summing circuit which receives the width adjustment has a high input impedance so that the width adjustment may be made with a voltage signal from a digital to analog converter (DAC) or other DC source. The noise from the voltage source is eliminated by the feedback networks and thus does not affect the horizontal line width. The feedback provided to the voltage regulator forces the current through the horizontal yoke to follow the sum of the width and pincushion inputs. The prior art lacks the feedback provided by the present invention so is not able to provide the above-listed characteristics of the present invention.

DESCRIPTION OF THE PREFERRED EMBODIMENT

Figure 1:
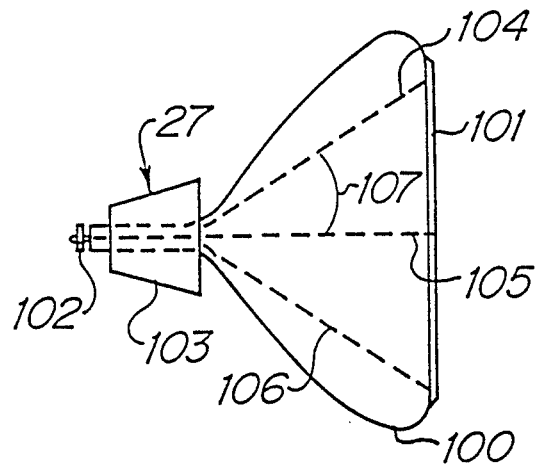
FIG. 1 shows a cathode ray tube (CRT).

FIG. 1 shows a functional diagram of a cathode ray tube (CRT) 100. An electron gun 102 produces a stream of electrons 105 which generate light upon colliding with a phosphor screen 101. A vertical deflection coil within a yoke housing 103, driven by a signal placed on a vertical yoke input 27, deflects the path of electron stream 105. To illustrate this deflection a deflected path 104 of electron stream 105 and a deflected path 106 of electron stream 105 are shown. A deflection angle 107 is directly dependent upon the current through yoke input 27. So that horizontal lines on screen 101 are evenly spaced, the current through vertical yoke input 27 requires "S" correction to take into account the increasing vertical change of position of electron stream 105 striking phosphor screen 101 for a given increase of angle 107.

Figure 4:
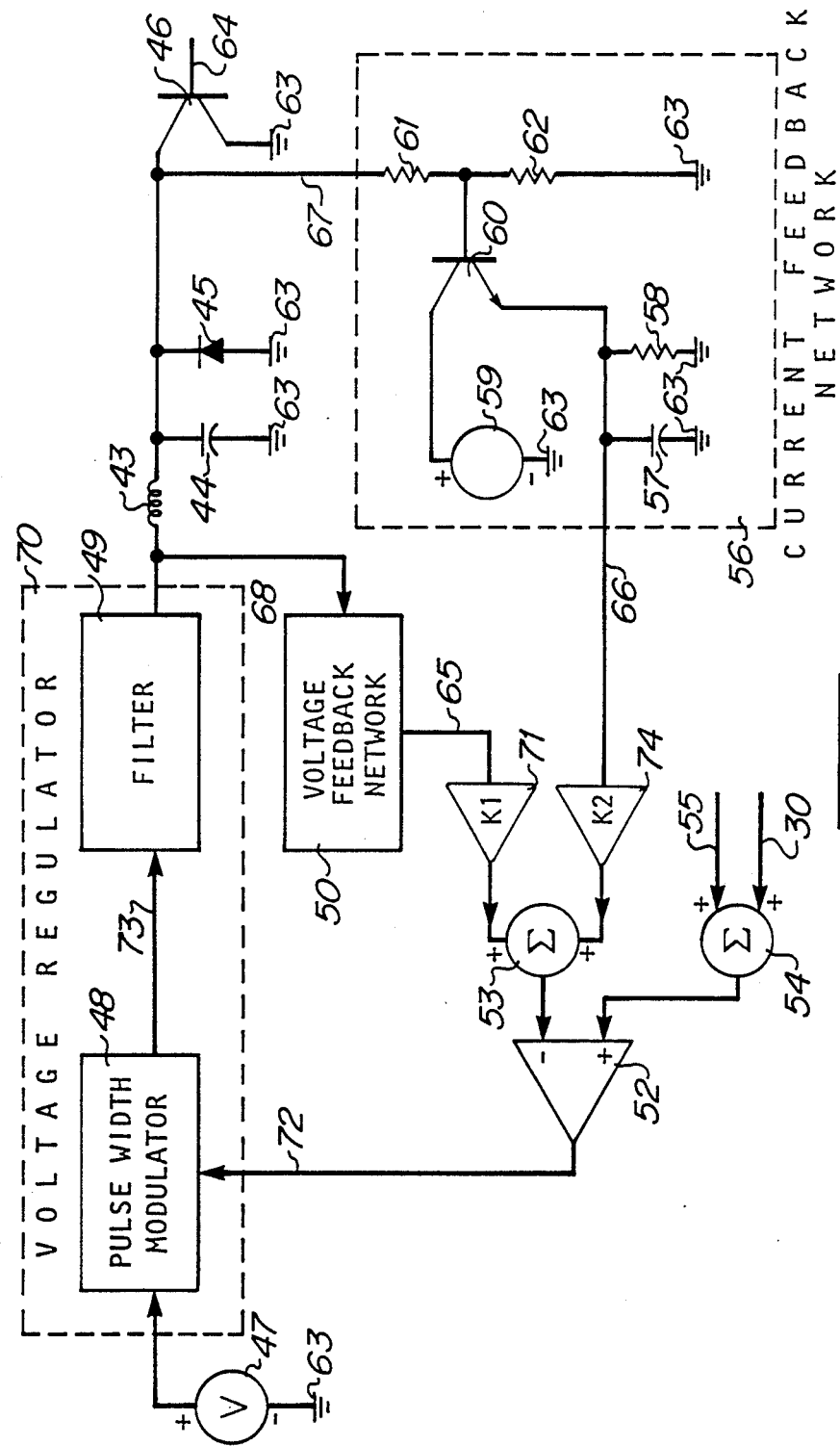
FIG. 4 shows a circuit, with an input for pincushion correction, used to generate a horizontal drive signal used to drive the horizontal deflection coil of the CRT shown in FIG. 1 in accordance with the preferred embodiment of the present invention.

Electron stream 105 is also deflected in a horizontal direction by use of a horizontal yoke 43 shown in FIG. 4. So that the length for horizontal lines on phosphor screen 101 is the same, the current of the signal through horizontal yoke input 43 requires "pincushion" correction to take into account the increasing horizontal change in position of electron stream 105 at phosphor screen 101 for a given increase in angle 107.

Figure 2:
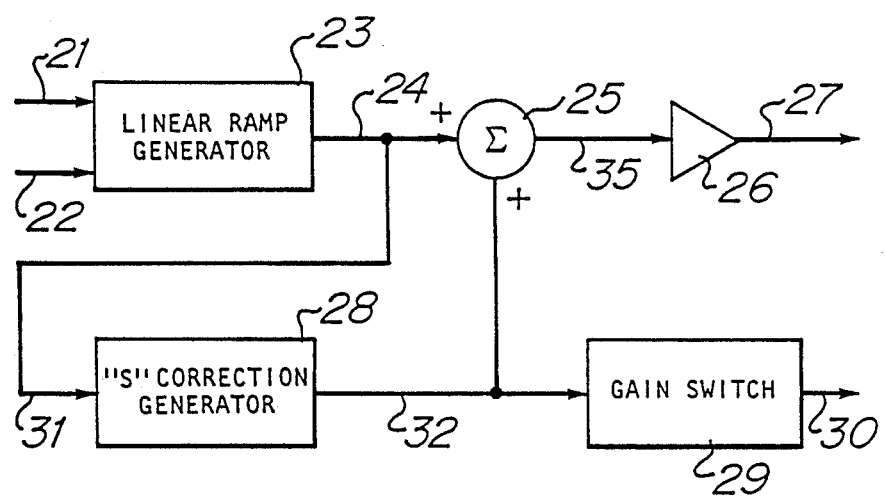
FIG. 2 shows a block diagram of a circuit which generates a ramp signal used to drive the vertical deflection coil of a CRT.

FIG. 2 is a block diagram of a circuit which may be used to generate signal 27. A linear ramp generator 23 has an input 21 which receives a clock pulse. The frequency of the clock pulse determines the frequency of a ramp signal which is produced by linear ramp generator 23 and placed on an output 24. Linear ramp generator 23 also has an input 22 upon which is placed a direct current (DC) signal. The value of the voltage of the DC signal determines the peak-to-peak current of the signal placed on vertical yoke input 27.

Output 24 feeds into a summation circuit 25. Output 24 is also tapped by an input 31 of an "S" correction generator 28. "S" correction generator 28 produces an "S" correction signal on an output 32. The "S" correction signal is fed into summation circuit 25 and into a gain switch 29. Summation circuit 25 produces a signal on an output 35 which is amplified by a transconductance amplifier 26 and applied to vertical yoke input 27. Transconductance amplifier 26 converts the voltage signal on output 35 into a current signal which flows through the vertical deflection coil within yoke housing 103. That is, the current of the signal generated by transconductance amplifier 26 at vertical yoke input 27 is proportional to the voltage of the signal at output 35.

Gain switch 29 essentially acts as a rectifier to produce a pincushion correction signal—placed on a line 30—used in the generation of a signal applied to horizontal yoke 43 of CRT 100.

Figure 3:
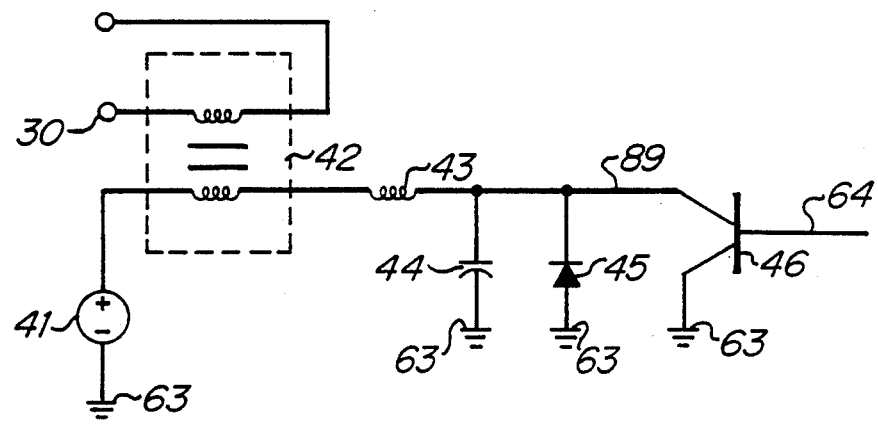
FIG. 3 shows an example of a prior art circuit which introduces a pincushion correction to a signal used to drive the horizontal deflection coil of the CRT shown in FIG. 1.

FIG. 3 shows how in the prior art a transformer 42 is typically used to add a pincushion correction signal on line 30 to a voltage signal generated by a voltage source 41 before using the resultant signal to drive yoke 43. A capacitor 44 typically has a capacitance of 3300 pico farads. A signal on an input 64 has a voltage waveform 81 shown in FIG. 3A.

At a time 85, waveform 81 steps to a positive voltage resulting in a switch 46 turning "on". When switch 46 is "on" line 89 is connected to a reference voltage 63 through switch 46. This causes a current 82 (shown in FIG. 3A) across horizontal yoke 43 to begin to linearly increase. Current 82 stores energy in the magnetic field of horizontal yoke 43.

Figure 3A:
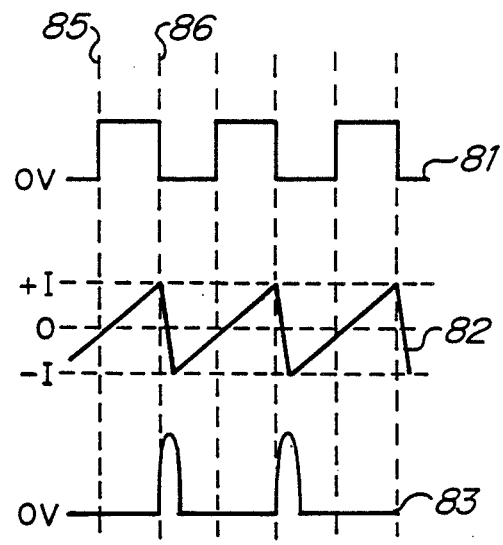
FIG. 3A shows waveforms for signals on the circuit shown in FIG. 3.

Upon waveform 81 returning to 0 voltage at a time 86, switch 46 is turned "off". For a short time after switch 46 is turned off, current continues to flow through horizontal yoke 43. This current charges capacitor 44. A voltage waveform 83 for a signal across capacitor 44 is seen in FIG. 3A. The signal across capacitor 44 reaches a peak voltage of approximately 1000 volts. This high voltage forces a change in direction of current 82 through horizontal yoke 43. Voltage 83 across capacitor 44 does not go negative because of the presence of a diode 45.

FIG. 4 shows a circuit including an input 30 for a pincushion correction voltage, used to generate a horizontal yoke current through horizontal yoke 43 in accordance with the preferred embodiment of the present invention. A direct current (DC) voltage source 47 provides a first input to a voltage regulator 70. Voltage regulator 70 includes a pulse width modulator 48 and an LC filter 49. Pulse width modulator 48 generates a signal with a voltage waveform 96—shown in FIG. 5—which oscillates between 0 volts and 150 volts at approximately 185 kilohertz. This signal is placed on a line 73.

Figure 5:
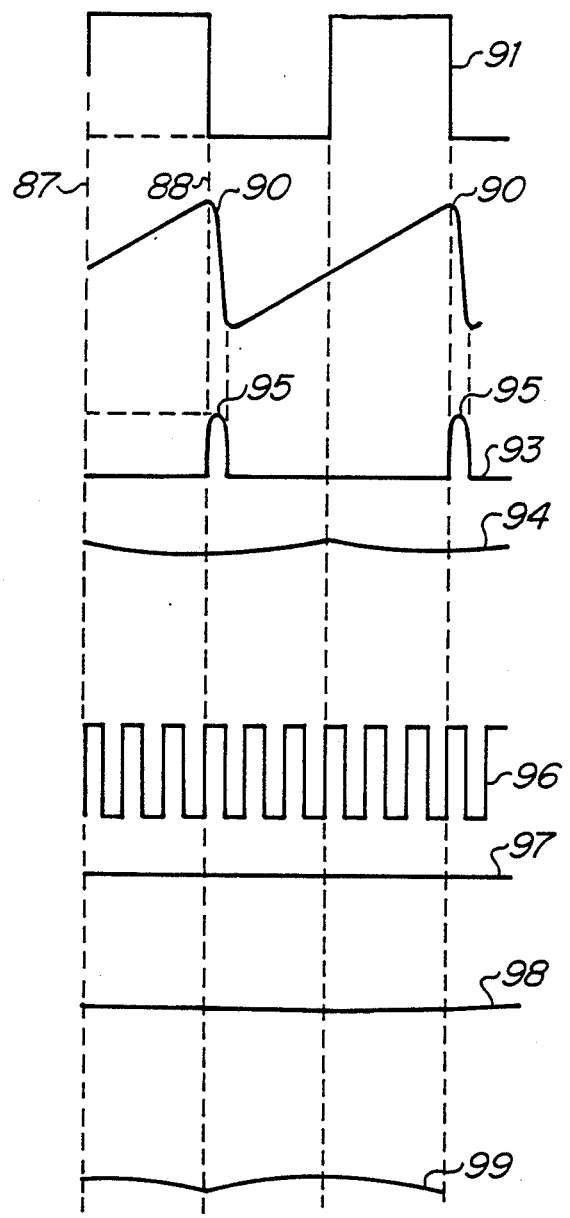
FIG. 5 shows waveforms for signals on the circuit shown in circuit 4 in accordance with the preferred embodiment of the present invention.

LC filter 49 produces a DC signal with a voltage of approximately 80 volts. A voltage waveform 94 for the signal produced by LC filter 49 is shown in FIG. 5. The voltage of the DC signal is varied based on the duty cycle of the signal generated by pulse width modulator 48.

The circuit shown in FIG. 4 includes two feedback networks. The feedback networks eliminate noise from voltage source 47 so that the horizontal line width is a constant. A voltage waveform 97 of a signal on an output 65 of a voltage feedback network 50 is proportional to the voltage of a signal on an input 68 of voltage feedback network 50. In the present circuit voltage waveform 97 is approximately a constant voltage of six volts.

A current feedback network 56 determines a peak scan current 90 of a current 92 through horizontal yoke 43. In the present circuit peak scan current is approximately 3 amps. Current feedback network 56 reduces the flyback voltage using a resistive divider. A peak detector stores the peak of the divided-down flyback pulse. The flyback pulse peak is proportional to the peak scan current. The result is that the voltage of a signal placed on an output 66 of current feedback network 56 is proportional to the peak current through horizontal yoke 43.

Current feedback network 56 includes a resistor 61 and a resistor 62 acting as the resistive divider. In the preferred embodiment resistor 61 has a value of 1.08 megohm ohms and resistor 62 has a value of 11.0 kilohms.

A signal on an input 64 has a voltage waveform 91 shown in FIG. 5. Voltage waveform 91 oscillates between 1 volt and −1 volt at approximately 35 kilohertz. The actual frequency is dependent upon the video card supplying the horizontal deflection frequency.

At a time 87, waveform 91 steps to a positive voltage resulting in switch 46 turning "on. When switch 46 is "on" line 67 is connected to reference voltage 63 through switch 46. This causes current 92 across horizontal yoke 43 to begin to linearly increase. Current 92 stores energy in horizontal yoke 43.

Upon waveform 91 returning to −1 volt at a time 88, switch 46 is turned "off". For a short time after switch 46 is turned off, current continues to flow through horizontal yoke 43. This current charges capacitor 44. A voltage waveform 93 for a signal across capacitor 44 is seen in FIG. B. The signal across capacitor 44 reaches a peak voltage 95 of approximately 900 volts. This high voltage 95 forces a change in direction of current 82 through horizontal yoke 43. Voltage 93 across capacitor 44 does not go negative because of the presence of diode 45.

At peak scan current 90 a transistor 60 is turned on allowing current from a 25 volt voltage source 60 to reach a line 66 and thus resistor 58 and a capacitor 57. Capacitor 57 has a capacitance of, for example, 0.01 microfarad. Resistor 58 has an resistance of, for example 470 kilohms. Capacitor 57 is charged to a voltage proportional to peak scan voltage 90. The voltage across capacitor 57 is represented in FIG. 5 by a waveform 98. In the present circuit, the waveform is approximately a steady value of 6.8 volts. The voltage 98 is stored on capacitor 57 and thus appears on output 66 of current feedback network 56.

A summing circuit 53 sums signals from output 65 of voltage feedback network 50 through a gain stage 71 and from output 66 of current feedback network 56 through a gain stage 74. Similarly, a summing circuit 54 sums the pincushion correction signal on line 30 of gain switch 29 and a control signal on summing circuit input 55. The control signal on summing circuit input 55 controls the width of horizontal lines across screen 101. Summing circuit 54 has a high impedance input at line 55. Horizontal line width may therefore be an external device without need for the external device to supply much power, just voltage. This allows horizontal width to be controlled by digital to analog converters.

An amplifier 52 receives input from summing circuit 53 and summing circuit 54. Amplifier 52 produces feedback to pulse width modulator 48 of voltage regulator 70 on a line 72. This feedback forces the output voltage of summing circuit 53 to match the output voltage of summing circuit 54. In this way the pincushion correction signal is added to the signal through horizontal yoke 43. Also, as the frequency of voltage waveform 91 is changed by the video card supplying the horizontal and vertical deflection frequencies, the feedback from amplifier 52 causes the duty cycle of pulse width modulator 48 to change. This results in a change in the voltage of waveform 94 so that the horizontal line width is kept constant.

Figure 6:
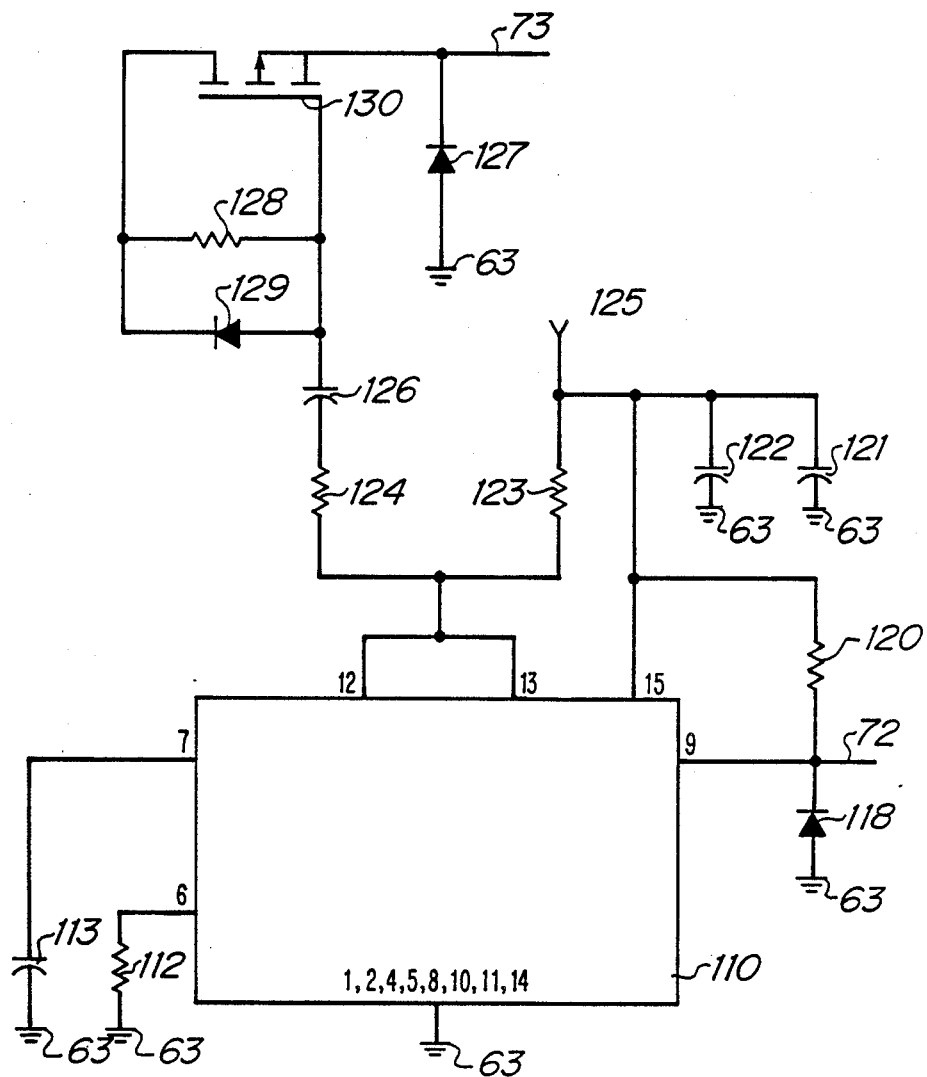
FIGS. 6, 7 and 8 are schematics which show additional detail of the circuit shown in FIG. 4 in accordance with the preferred embodiment of the present invention.

FIG. 6 is a schematic of pulse width modulator 48. Pulse width modulator includes a 3524AN pulse width modulator integrated circuit 110. Pins 1, 2, 4, 5, 8, 10, 11 and 14 of chip 110, represented by a line 111, are connected to reference voltage 63. A pin 6 of chip 110 is connected through a resistor 112 to reference voltage 63. Resistor 112 has an resistance of, for example 5.6 kilohms. A pin 7 of chip 110 is connected through a capacitor 113 to reference voltage 63. Capacitor 113 has a capacitance of, for example, 1000 picofarads. Pins 12 and 13 of chip 110 are coupled together and to a resistor 123 and a resistor 124. Resistor 123 has an resistance of, for example, 330 ohms. Resistor 124 has an resistance of, for example, 33 ohms. A pin 15 of chip 110 is connected to a 12 volt voltage source 125. Pin 15 is also connected to resistor 123, a resistor 120, a capacitor 121, and a capacitor 122. Resistor 122 has an resistance of, for example, 10 kilonms. Capacitor 121 has a capacitance of, for example, 100 microfarads. Capacitor 122 has a capacitance of, for example, 0.1 microfarad. A pin 9 of chip 10 his connected to line 72. Pin 9 is also connected to a diode 118 and to resistor 120. Diode 118 is, for example, has a critical voltage of 3.48 volts. Pulse width modulator also includes a capacitor 126, a diode 129, a resistor 128, a switch 130 and a diode 127 arranged as shown. Capacitor 126 has a capacitance of, for example, 0.01 microfarads. Diode 129 is for example a IN4150 diode. Resistor 128 has an resistance of, for example, 5.1 kilohms. Switch 130 is, for example, a IRFD9210 transistor.

Figure 7:
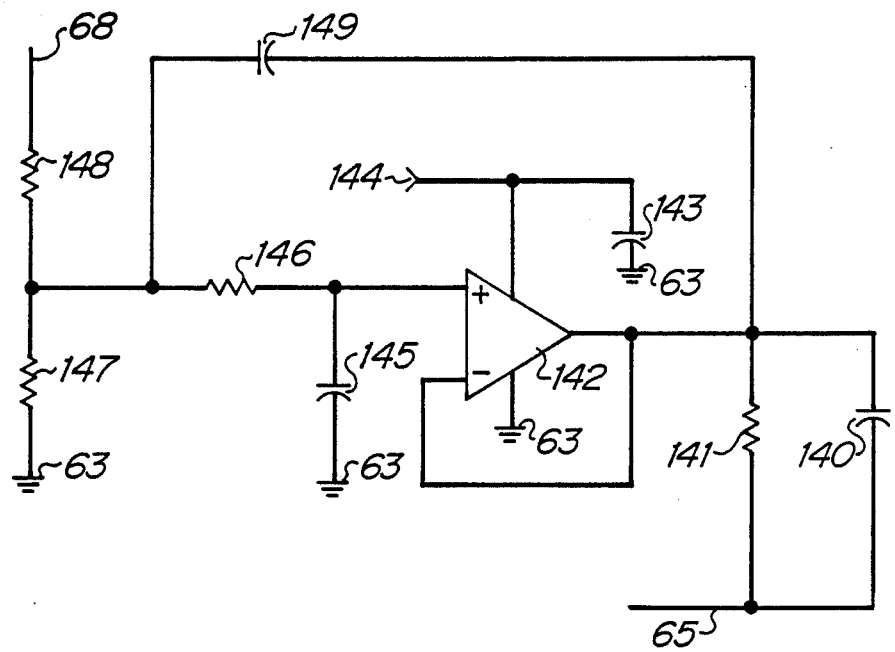

FIG. 7 shows a schematic of voltage feedback network 50. This embodiment eleviates the need for separate gain stage 71. Voltage feedback network is shown to include a capacitor 140, a resistor 141, an amplifier 142, a capacitor 143, a voltage source 144, a capacitor 145, a resistor 146, a resistor 147, a resistor 148 and a capacitor 149 arranged as shown. Capacitor 140 has a capacitance of, for example, 0.033 microfarad. Resistor 141 has an resistance of, for example, 22 kilohms. Amplifier 142 is, for example, an LM324 amplifier. Capacitor 143 has a capacitance of, for example, 0.1 microfarad. Voltage source 144 supplies a signal with a constant voltage of, for example, 25 volts. Capacitor 145 has a capacitance of, for example, 0.01 microfarad. Resistor 146 has an resistance of, for example, 820 ohms. Resistor 147 has an resistance of, for example, 1.2 kilohms. Resistor 148 has an resistance of, for example, 22 kilohms. Capacitor 149 has a capacitance of, for example, 0.022 microfarad. Node 65 looks into the inverting in part of amplifier.

Figure 8:
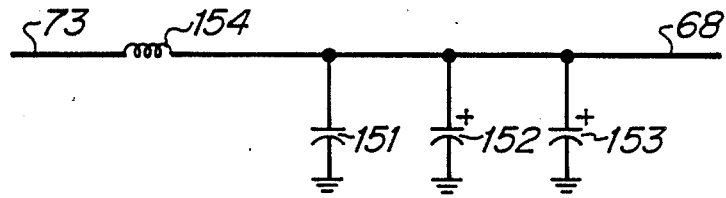

FIG. 8 shows a schematic of filter 49. Filter 49 is shown to include an inductor 154, a capacitor 151, a capacitor 152 and a capacitor 153 arranged as shown. Inductor 154 has, for example, an inductance of 4 milihenries. Capacitor 151 has, for example, a capacitance of 0.01 microfarad. Capacitor 152 has, for example, a capacitance of 10 microfarads. Capacitor 153 has, for example, a capacitance of 10 microfarads.

I claim:

1. A signal generator for generating a yoke signal for application to a horizontal yoke of a cathode ray tube, the signal generator having as a first input a first dc signal at a width voltage which determines the width of horizontal scan lines of the cathode ray tube and having a second input a pincushion correction signal having a pincushion correction signal voltage, the signal generator comprising:

a voltage source;

yoke current generator means, coupled to the horizontal yoke for generating a yoke current, the yoke current passing through the horizontal yoke, the yoke current having a peak value;

current feedback network, coupled to the yoke generator means, the current feedback network generating a first feedback signal with a first feedback signal voltage proportional to the peak value of the yoke current;

voltage feedback network, coupled to the horizontal yoke, for generating a second feedback signal with a second feedback signal voltage proportional to a yoke voltage applied to the horizontal yoke;

first summing means, coupled to the first input and to the second input, for producing a first summing signal having a first summing signal voltage which is the sum of the width and the pincushion correction signal voltage;

second summing means, coupled to the current feedback network and to the voltage feedback network, for producing a second summing signal which has a second summing signal voltage which is the sum of the first feedback signal voltage and the second feedback signal voltage;

amplification means, coupled to the first summing means and to the second summing means for producing a third feedback signal having a third feedback signal voltage, the third feedback signal voltage being dependent on the difference of the first summing signal voltage and the second summing signal voltage; and, voltage regulator means, coupled to the voltage source, the horizontal yoke, the voltage feedback network and the amplification means, for regulating the yoke voltage based on the third feedback signal voltage.

2. A signal generator as in claim 1 wherein the voltage regulator means comprises:

a pulse width modulator coupled to the voltage source and to the amplification means, the pulse width modulator producing a pulse width modulated signal with a duty cycle varying based on the third feedback signal voltage; and;

filter means coupled to the pulse width modulator, the voltage feedback network and the horizontal yoke for varying the yoke voltage based on the duty cycle of the pulse width modulated signal.

3. A signal generator as in claim 1 wherein the current feedback network comprises:
   a resistive divider coupled to the yoke current generator means; and,
   a peak detector means, coupled to the resistive divider and to the second summing means, for storing the first feedback signal voltage.

4. A signal generator as in claim 3 wherein the peak detector means comprises:
   a reference voltage;
   a transistor having an emitter, a collector and a base, the base being coupled to the resistive divider and the emitter being coupled to the second summing means;
   a transistor voltage source coupled to the collector of the transistor and to the reference voltage;
   a resistance coupled to the emitter of the transistor and to the reference voltage; and,
   a capacitance coupled to the emitter of the transistor and to the reference voltage.

5. A signal generator as in claim 1 wherein the first summing means has a high input impedance at the first input.

6. A signal generator as in claim 1 wherein the signal generator additionally comprises an input switch, coupled to a first end of the horizontal yoke, the switch turning on and off at a first frequency which determines horizontal frequency of the yoke signal, the switch electrically coupling the first end of the horizontal yoke to a reference voltage when the switch is turned on.

7. A signal generator as in claim 6 wherein the current feedback generates the first feedback signal so that when the first frequency varies, the voltage regulator varies the yoke voltage so that the width of the horizontal scan lines of the cathode ray tube remain constant.

8. A signal generator for generating a yoke signal for application to a horizontal yoke of a cathode ray tube, the signal generator comprising:
   a voltage source;
   yoke current generator means, coupled to the horizontal yoke for generating a yoke current, the yoke current passing through the horizontal yoke, the yoke current having a peak value;
   current feedback network, coupled to the yoke generator means, the current feedback network generating a first feedback signal with a first feedback signal voltage proportional to the peak value of the yoke current;
   voltage feedback network, coupled to the horizontal yoke, for generating a second feedback signal with a second feedback signal voltage proportional to a yoke voltage applied to the horizontal yoke;
   summing means, coupled to the current feedback network and to the voltage feedback network, for producing a summing signal which has a summing signal voltage which is the sum of the first feedback signal voltage and the second feedback signal voltage; and,
   voltage regulator means, coupled to the voltage source, the horizontal yoke, the voltage feedback network and the summing means, for regulating the yoke voltage based on the summing signal voltage.

9. A signal generator as in claim 8 wherein the voltage regulator means comprises:
   a pulse width modulator coupled to the voltage source and to the amplification means, the pulse width modulator producing a pulse width modulated signal with a duty cycle varying based on the summing signal voltage; and;
   filter means coupled to the pulse width modulator, the voltage feedback network and the horizontal yoke for varying the yoke voltage based on the duty cycle of the pulse width modulated signal.

10. A signal generator as in claim 8 wherein the current feedback network comprises:
    a resistive divider coupled to the yoke current generator means; and,
    a peak detector means, coupled to the resistive divider and to the summing means, for storing the first feedback signal voltage.

11. A signal generator as in claim 10 wherein the peak detector means comprises:
    a reference voltage;
    a transistor having an emitter, a collector and a base, the base being coupled to the resistive divider and the emitter being coupled to the second summing means;
    a transistor voltage source coupled to the collector of the transistor and to the reference voltage;
    a resistance coupled to the emitter of the transistor and to the reference voltage; and,
    a capacitance coupled to the emitter of the transistor and to the reference voltage.

12. A signal generator as in claim 8 wherein the yoke current generator means includes an input switch, coupled to a first end of the horizontal yoke, the switch turning on and off at a first frequency which determines horizontal frequency of the yoke signal, the switch electrically coupling the first end of the horizontal yoke to a reference voltage when the switch is turned on.

13. A signal generator as in claim 12 wherein the current feedback generates the first feedback signal so that when the first frequency varies, the voltage regulator varies the yoke voltage so that the width of the horizontal scan lines of the cathode ray tube remain constant.

* * * * *

UNITED STATES PATENT AND TRADEMARK OFFICE
CERTIFICATE OF CORRECTION

PATENT NO. : 4,956,586
DATED : September 11, 1990
INVENTOR(S) : Kirk P. Gipson and Ronald M. Guly It is certified that error appears in the above-identified patent and that said Letters Patent is hereby corrected as shown below:

Column 5, Line 56, "eleviates" should read -- obviates --

Signed and Sealed this

Eleventh Day of August, 1992

Attest:

DOUGLAS B. COMER

*Attesting Officer*      *Acting Commissioner of Patents and Trademarks*